Feb. 17, 1953          H. C. MILLER          2,628,544
EXPANSION JOINT
Filed Sept. 19, 1951
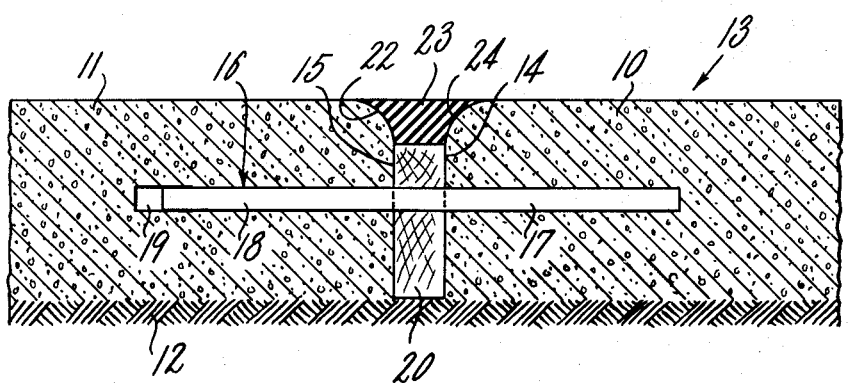
INVENTOR.
HERMAN C. MILLER
BY Henry W. Seigle
ATTORNEY Patented Feb. 17, 1953

2,628,544

UNITED STATES PATENT OFFICE 2,628,544

EXPANSION JOINT

Herman C. Miller, Waterbury, Conn., assignor to United States Rubber Company, New York, N. Y., a corporation of New Jersey Application September 19, 1951, Serial No. 247,379

14 Claims. (Cl. 94—18)

This invention relates to thermoplastic compositions for sealing joint sections in concrete pavements, and particularly to hot-melting type compositions for expansion joint sealers, and contraction or dummy joint sealers, in fueling and warm-up areas, and in take-off areas for jet planes in airfields.

In my prior U. S. Patent 2,536,611, there is disclosed a composition for joint fillers for expansion joints, and for contraction or dummy joints, which has a high resistance to deterioration by the liquid fuels used in jet planes. Such composition comprises primarily a major proportion of coal tar pitch and a minor proportion of a butadiene-acrylonitrile copolymer synthetic rubber.

I have found that the resistance to deterioration by liquid hydrocarbon fuels, such as jet fuels, of thermoplastic compositions comprising a major proportion of coal tar pitch and a minor proportion of butadiene-acrylonitrile synthetic rubber is greatly improved by the incorporation therein of a small amount of carbon black. The carbon black must be incorporated in the composition as such, and will surprisingly give improved jet fuel resistance even to compositions already containing carbon black from a butadiene-acrylonitrile synthetic rubber reclaim that may be used in preparing the thermoplastic composition. The composition of the present invention may also be used in spaces between the faces of other constructional members, as in bridges, sidewalks, retaining walls, or as a road surfacing composition.

The thermoplastic composition of the present invention comprises a major proportion, preferably at least 70%, of coal tar pitch, 10 to 20% of butadiene-acrylonitrile copolymer synthetic rubber and 1 to 10% of carbon black added as such. All percentages and parts referred to herein are by weight. Where reclaimed butadiene-acrylonitrile synthetic rubber is added, the butadiene-acrylonitrile copolymer content thereof is used to calculate the 10 to 20% synthetic rubber in the thermoplastic composition. However, crude butadiene-acrylonitrile synthetic rubber, i. e. the rubber as prepared in its uncompounded state, is preferred over the reclaim, or at least a major proportion of the 10 to 20% butadiene-acrylonitrile content is preferably the crude synthetic rubber. The coal tar pitch may have a viscosity as measured by the float test at 50° C. in the range of 27 to 220 seconds, preferably in the range of 42 to 150 seconds. The float test is commonly used for testing the viscosity of semi-solid bituminous materials used for road purposes, and is designated as "Standard Method of Float Test for Bituminous Materials" (D 139–27), A. S. T. M. Standards 1942, II, 480. A detailed description of the test may be found in "Asphalt and Allied Substances" by Herbert Abraham, 5th edition, pages 974–977, pub. by Van Nostrand 1945. The butadiene-acrylonitrile synthetic rubber is a copolymer of a major proportion (51 to 88 parts) of butadiene-1,3 and a minor proportion (correspondingly 49 to 12 parts) of acrylonitrile (or the equivalent methacrylonitrile). In order to improve the low temperature flexibility of thermoplastic compositions where some coal tar pitches are used, there may optionally be incorporated in the thermoplastic composition up to 10% of a polymerized vegetable oil, such as polymerized linseed oil, polymerized rape seed oil, or polymerized castor oil; e. g. as made by air blowing or heat polymerizing castor oil in known manner. In order to lower the melting point of the thermoplastic composition where some coal tar pitches are used, there may optionally be incorporated in the thermoplastic composition up to 15% of a hydrocarbon oil which has an initial boiling point about 300° C., such as coal tar oil, transformer oil, light mineral oil, light, medium or heavy lubricating oils.

The following examples are illustrative of the invention:

Example I

Three batches of 100 parts each of a crude butadiene-acrylonitrile synthetic rubber comprising a copolymer of 65 parts of butadiene-1,3 and 35 parts of acrylonitrile were broken down on a rubber mill. In one batch no carbon black was added; in the second batch 30 parts of carbon black was incorporated; and in the third batch 50 parts of carbon black was incorporated. The batches were transferred to an internal mixer of the Werner and Pfleiderer type where 400 to 500 parts of coal tar pitch having a viscosity as measured by the float test at 50° C. of 100 to 150 seconds was added in increments, steam at approximately 30 pounds pressure being applied to the mixer jacket after about two-thirds of the coal tar pitch had been added. The finished batches were poured at about 250° F. for packaging.

Standard penetration tests were made on the three batches before and after immersion in jet fuel for 48 hours at 100° F. In the penetration tests, a penetrometer, or cone with a certain load, is allowed to sink into or penetrate the surface of the compound under test for five seconds at 77° F., and the distance the core penetrates the composition is measured in millimeters. The increase in penetration after treatment with jet fuel indicates the extent to which the composition is deteriorated by the jet fuel. If a composition was completely resistant to jet fuel, there would, of course, be no increase in penetration. In comparing compositions, those with larger increases in penetration after treatment with the jet fuel, show the greater deterioration by the jet fuel. In the above tests, the composition consisting of the coal tar pitch and the butadiene-acrylonitrile synthetic rubber without any carbon black showed an increase in penetration on treatment with the jet fuel of 35 millimeters. The batches, with the 30 and 50 parts of carbon black showed increase in penetration of only 15 and 20 millimeters respectively, indicating greatly increased resistance to the jet fuel. (A difference of ±2 millimeters is not significant.)

*Example II*

In this case, thermoplastic compositions were prepared from about 500 parts of coal tar pitch having a viscosity as measured by the float test at 50° C. of 100 to 150 seconds, 100 parts of crude synthetic rubber copolymer of 65 parts of butadiene-1,3 and 35 parts of acrylonitrile, and 30 parts of polymerized vegetable oil. In the first batch no carbon black was added; in the second and third batches 5.6 parts (about 1%) and 20 parts (about 3%), respectively, of carbon black were incorporated.

Penetration tests were run on the three batches before and after immersion in jet fuel as in Example I. The increase in penetration in the test on the composition containing no carbon black was 35 millimeters. The increase in penetration in the tests on the compositions containing 1% and 3% carbon black was 29 and 22 millimeters, respectively, showing significant improvement in resistance to fuel oils even with such low carbon black contents.

*Example III*

This example shows that the carbon black should be added to the thermoplastic composition as such, and that it will give improvement to thermoplastic compositions made with reclaimed butadiene-acrylonitrile copolymer synthetic rubber which contains large amounts of carbon black itself.

Two batches were prepared from 420 parts of coal tar pitch having a viscosity as measured by the float test at 50° C. of 100 to 150 seconds, 70 parts of crude butadiene-acrylonitrile copolymer synthetic rubber 85.5 parts of butadiene acrylonitrile synthetic rubber reclaim, 85 parts of coal tar oil, and 25 parts of polymerized vegetable oil. The reclaim contained 35% butadiene-acrylonitrile copolymer 40% carbon black and 25% inorganic matter. The 85.5 parts of the reclaim was thus equivalent to 30 parts of butadiene-acrylonitrile copolymer (making 100 parts total with the 70 parts of crude synthetic rubber), and 34.2 parts of carbon black. No separate carbon black was added to one batch, and 21 parts of separate carbon black was mixed into the second thermoplastic composition. A third batch was prepared from 420 parts of the same coal tar pitch, 100 parts of the crude butadiene-acrylonitrile synthetic rubber, 85 parts of coal tar oil, 25 parts of polymerized vegetable oil, and 30 parts of carbon black introduced as such.

In penetration tests on the first two batches before and after immersion in jet fuel, the increase in penetration in the case of the first composition containing only the 34.2 parts of carbon black in the reclaim but no added carbon black was 24 millimeters, while in the second case where 21 parts of carbon black was added as such, the increase in penetration was only 11 millimeters, showing significant improvement in resistance to fuel oil by the addition of carbon black even with reclaim already containing carbon black. In the penetration test on the third composition made from the crude butadiene-acrylonitrile synthetic rubber without reclaim, and containing carbon black added as such, the increase in penetration was 14 millimeters, again showing the improved resistance to jet fuel by the addition of carbon black as such, i. e. not in reclaim form.

The thermoplastic compositions of the present invention as applied to an expansion joint is illustrated in the drawing which is a section of one form of a transverse expansion joint. In the drawing, concrete sections 10 and 11 are shown on a conventional pavement bed 12, the top surface 13 of the concrete sections being the road surface on which the wheels of the planes or other vehicles ride. When the concrete sections are poured, an expansion space is left between the adjacent faces 14 and 15 of the sections and an expansion joint assembly is embedded in the concrete sections. The expansion joint assembly comprises a number of longitudinal metal dowel bars 16 extending to the desired length on either side of the expansion space at the desired intervals across the width of the sections intermediate the bed 12 and the surface 13. The portions 17 of the dowel bars extending into the concrete section 10 are fixed in the concrete section 10 and the portions 18 of the dowel bars extending into the concrete section 11 are slidable in the concrete section 11 and terminate in sliding relation to metal sleeves 19 embedded in the concrete section 11. The lower part of the expansion space between the faces 14 and 15 is filled with a conventional preformed expansion joint filler such as wood board, or fiber strip 20, leaving an open space the required distance down from the top surface 13 for the joint sealer, such as the thermoplastic composition of the present invention. The top edges of the faces 14 and 15 of the expansion joint are tooled or rounded at 21 and 22. The sealing compositon of the present invention is melted and poured into the top of the expansion space and allowed to cool and harden as at 23. The poured composition of a formulation as above described, adheres on cooling to the faces 14 and 15 of the paving slabs. The composition has the ability to maintain its adhesiveness and bond to the concrete at high atmospheric temperatures and at sub-freezing temperatures and to retain at these temperatures a high degree of distendability, compressibility and recuperative power, so that a successful waterstop is maintained throughout the seasonal changes which expand and contract the concrete paving slabs. The expansion joint construction described is merely one form of conventional expansion joint construction, and except for the joint sealing compositon forms no part of the present invention. Contraction or dummy joints are similar to the expansion joint shown in the drawing except that the concrete paving sections are closer together and may abut, and there would generally be no sleeves embedded in the concrete for the ends of the sliding part of the dowel bars, or the dowel bars may be omitted altogether. The drawing is merely illustrative of the use of the composition of the present invention as a joint sealer in paving.

In view of the many changes and modifications that may be added without departing from the principles underlying the invention, reference should be made to the appended claims for an understanding of the scope of the protection afforded the invention.

Having thus described my invention, what I claim and desire to protect by Letters Patent is:

1. In a paving construction, the combination of a pair of adjacent paving sections, and a joint sealing composition between said sections comprising a major proportion by weight of coal tar pitch, 10% to 20% by weight of a synthetic rubber copolymer of a major proportion of butadiene-1,3 and a minor proportion of acrylonitrile, and 1% to 10% by weight of carbon black added as such.

2. In a paving construction, the combination of a pair of adjacent paving sections, and a joint sealing composition between said sections comprising a major proportion by weight of coal tar pitch, 10% to 20% by weight of a crude synthetic rubber copolymer of a major proportion of butadiene-1,3 and a minor proportion of acrylonitrile as prepared in its uncompounded state, and 1% to 10% by weight of carbon black added as such.

3. In a paving construction, the combination of a pair of adjacent paving sections, and a joint sealing composition between said sections comprising at least 70% by weight of coal tar pitch, 10% to 20% by weight of a synthetic rubber copolymer of a major proportion of butadiene-1,3 and a minor proportion of acrylonitrile, and 1% to 10% by weight of carbon black added as such.

4. In a paving construction, the combination of a pair of adjacent paving sections, and a joint sealing composition between said sections comprising at least 70% by weight of coal tar pitch, 10% to 20% by weight of a crude synthetic rubber copolymer of a major proportion of butadiene-1,3 and a minor proportion of acrylonitrile as prepared in its uncompounded state, and 1% to 10% by weight of carbon black added as such.

5. In a paving construction, the combination of a pair of adjacent paving sections, and a joint sealing composition between said sections comprising a major proportion by weight of coal tar pitch, 10% to 20% by weight of a synthetic rubber copolymer of a major proportion of butadiene-1,3 and a minor proportion of acrylonitrile, 1% to 10% by weight of carbon black added as such, up to 15% hydrocarbon oil, and up to 10% by weight of polymerized vegetable oil.

6. In a paving construction, the combination of a pair of adjacent paving sections, and a joint sealing composition between said sections comprising a major proportion by weight of coal tar pitch, 10% to 20% by weight of a crude synthetic rubber copolymer of a major proportion of butadiene-1,3 and a minor proportion of acrylonitrile as prepared in its uncompounded state, 1% to 10% by weight of carbon black added as such, up to 15% by weight of hydrocarbon oil, and up to 10% by weight of polymerized vegetable oil.

7. A thermoplastic composition comprising a major proportion by weight of coal tar pitch, 10% to 20% by weight of a synthetic rubber copolymer of a major proportion of butadiene-1,3 and a minor proportion of acrylonitrile, and 1% to 10% by weight of carbon black added as such.

8. A thermoplastic composition comprising a major proportion by weight of coal tar pitch, 10% to 20% by weight of a crude synthetic rubber copolymer of a major proportion of butadiene-1,3 and a minor proportion of acrylonitrile as prepared in its uncompounded state, and 1% to 10% by weight of carbon black added as such.

9. A thermoplastic composition comprising at least 70% by weight of coal tar pitch, 10% to 20% by weight of a synthetic rubber copolymer of a major proportion of butadiene-1,3 and a minor proportion of acrylonitrile, and 1% to 10% of carbon black added as such.

10. A thermoplastic composition comprising at least 70% by weight of coal tar pitch, 10% to 20% by weight of a crude synthetic rubber copolymer of a major proportion of butadiene-1,3 and a minor proportion of acrylonitrile as prepared in its uncompounded state, and 1% to 10% by weight of carbon black added as such.

11. A thermoplastic composition comprising a major proportion by weight of coal tar pitch, 10% to 20% by weight of a synthetic rubber copolymer of a major proportion of butadiene-1,3 and a minor proportion of acrylonitrile, 1% to 10% by weight of carbon black added as such, up to 15% by weight of hydrocarbon oil, and up to 10% by weight of polymerized vegetable oil.

12. A thermoplastic composition comprising a major proportion by weight of coal tar pitch, 10% to 20% by weight of a crude synthetic rubber copolymer of a major proportion of butadiene-1,3 and a minor proportion of acrylonitrile as prepared in its uncompounded state, 1% to 10% by weight of carbon black added as such, up to 15% by weight of hydrocarbon oil, and up to 10% by weight of polymerized vegetable oil.

13. A thermoplastic composition comprising at least 70% by weight of coal tar pitch, 10% to 20% by weight of a synthetic rubber copolymer of a major proportion of butadiene-1,3 and a minor proportion of acrylonitrile, 1% to 10% by weight of carbon black added as such, up to 15% by weight of hydrocarbon oil, and up to 10% by weight of polymerized vegetable oil.

14. A thermoplastic composition comprising at least 70% by weight of coal tar pitch, 10% to 20% by weight of a crude synthetic rubber copolymer of a major proportion of butadiene-1,3 and a minor proportion of acrylonitrile as prepared in its uncompounded state, 1% to 10% by weight of carbon black added as such, up to 15% by weight of hydrocarbon oil, and up to 10% by weight of polymerized vegetable oil.

HERMAN C. MILLER.

No references cited.